United States Patent [19]  [11] Patent Number: 4,879,437
Dard et al.  [45] Date of Patent: Nov. 7, 1989

[54] MANUALLY CONTROLLED SWITCHING APPARATUS

[75] Inventors: Pierre Dard, Le Pecq; Fabrice Maës, Ermont, both of France

[73] Assignee: La Telemecanique Electrique, France

[21] Appl. No.: 144,977

[22] Filed: Jan. 19, 1988

[30] Foreign Application Priority Data

Sep. 30, 1987 [DE] Fed. Rep. of Germany ... 8713155[U]

[51] Int. Cl.⁴ .............................................. H01H 9/02
[52] U.S. Cl. .................................... 200/1 R; 200/296; 335/132; 361/211
[58] Field of Search ............... 200/293, 294, 295, 296, 200/307, 1 R; 361/331, 332, 211; 248/27.1; 335/132

[56] References Cited

U.S. PATENT DOCUMENTS 3,638,157  1/1972  Kruzik .................................. 337/6
4,092,508  5/1978  Rundel et al. ................. 74/10.41 X Primary Examiner—A. D. Pellinen
Assistant Examiner—Morris Ginsburg
Attorney, Agent, or Firm—William A. Drucker

[57] ABSTRACT

A switching and/or signalling apparatus is provided including a case formed of a base and a lid in which at least one manually or remote controlled switching unit is housed, particularly a contactor with an electro-thermal relay which is associated therewith, and the control members provided on the lid for actuating the switching unit, wherein, between the control unit and the side walls of the case, there is provided at least one fixed support element for at least one control element associated with the switching unit and actuated by the corresponding control member.

7 Claims, 3 Drawing Sheets

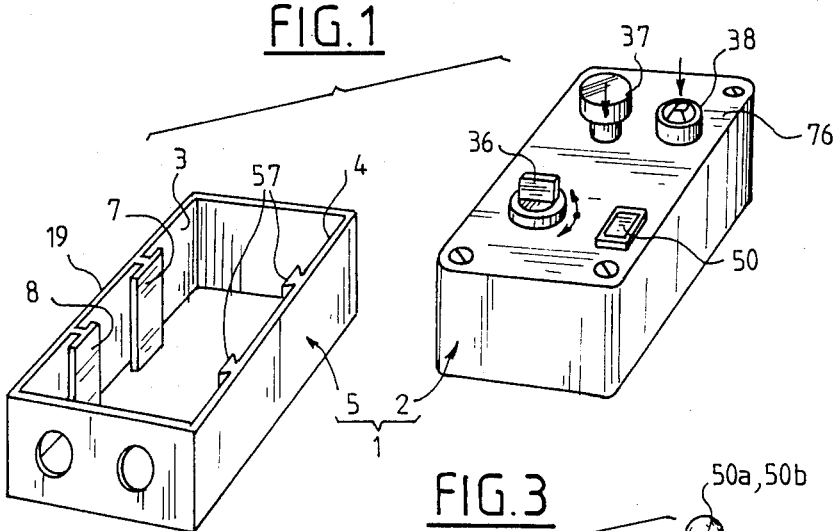
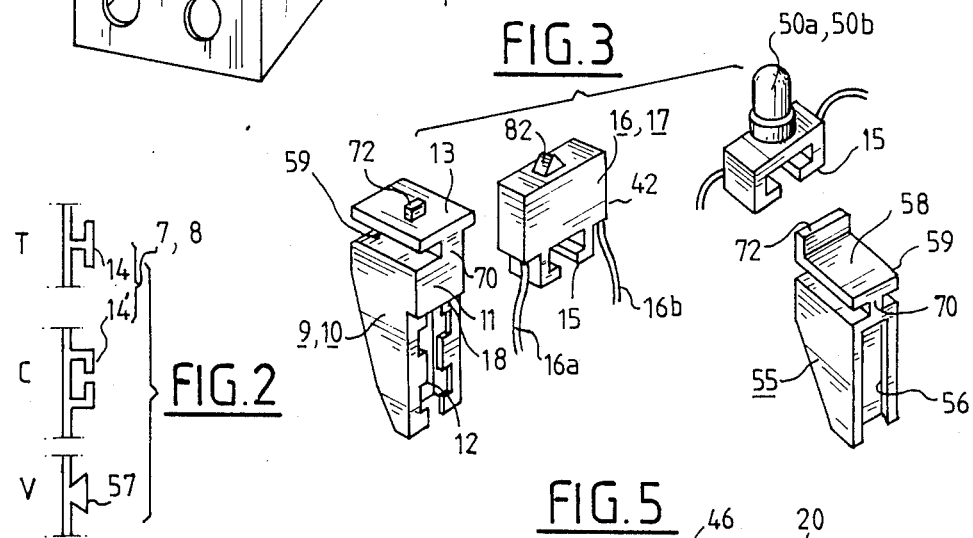
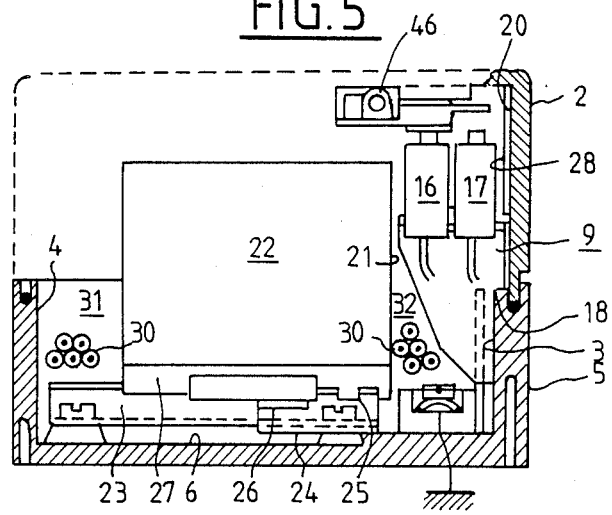

MANUALLY CONTROLLED SWITCHING APPARATUS

BACKGROUND OF THE INVENTION

1. Field of the Invention

The invention relates to a switching and/or signalling apparatus formed of a case having a base and a lid in which at least one switching unit is housed, actuated manually or by remote control, in particular a connector with an associated electro-thermal relay and control members provided on the lid for actuating the switching unit.

2. Description of the Prior Art

In such switching and/or signalling apparatus, the base receives for example a contractor and an electro-thermal relay. There may also exist several of these switching units. On the lid control members are generally disposed which are accessible from the outside making it possible, for example through interposed control elements such as switches etc, to actuate manually the switching unit housed in the case. Furthermore, the lid of such an apparatus often has observation windows or similar devices for observing display elements signalling for example certain operating conditions.

In the sealed switching installation described in DE-OS No. 25 46 176, the base has a cross piece placed above the upper opening which supports the additional signalling and control elements required. These additional elements are each disposed between the control member which is associated therewith, fixed to the lid, and the switching unit housed in the base.

The drawback of this approach resides in the fact that the space generally available in the case is badly used, and the arrangement of the control members on the lid, particularly for control elements placed close together and for the members to be actuated, is problematic.

The invention provides a switching and/or signalling apparatus of the above mentioned type which is simple in design and which makes possible a clear and functional distribution of the control members to be provided on the lid, to be actuated manually, as well as optimum use of the space normally available in the case, while providing reliable operation.

SUMMARY OF THE INVENTION

The object of the invention is achieved by the fact that between the switching unit and the side walls of the case at least one fixed support element is provided for at least one control element associated with a switching unit and actuated by the respective control member.

It is in this case particularly advantageous if at least one of the control elements or a member to be actuated is offset laterally with respect to the axis of the associated control member, disposed vertically with respect to the bottom of the base.

Because of this form, the apparatus may be relatively compact and have a particularly low profile. The invention makes possible a non-problematic and functional distribution as well as relatively large dimensions of the control members provided on the lid, particularly push buttons, rotary switches etc. The lateral offset of at least a part of the control members provided on the case with respect to the associated inserted control member also makes possible the control of control elements disposed close together without the least problem. The associated control member may then be disposed relatively far from each other and be fairly largely dimensioned, which means that the safety regulations can be readily complied with.

The fixed support elements provided between the switching unit and side walls of the case for the control or display elements further ensure stabilization of the case and precise positioning of the associated control elements.

On the inside, on the lid, it is possible to provide pressure marks which can be used for preindexing, fixing the position of the different control members.

It is also important that the apparatus constructed in accordance with the invention may be supplied in kit form and that it is modulable depending on the demand.

A particularly advantageous embodiment of the invention is distinguished by the fact that, on the inside of the side walls of the base and/or on the switching unit slides are provided for receiving the support elements, disposed vertically with respect to the bottom of the base, which fix the support elements in the transverse direction. These slides are preferably in the form of ribs on which the support elements are fixed.

In one embodiment of the invention, a support element is fixed in the vertical direction by means of a projection turned laterally outwardly bearing on the upper edge of the base, the support element being advantageously held in position towards the bottom by a projection disposed on the lid. This projection may be in the form of a rib provided on the inner face of the lid. When the lid of the apparatus is placed on the base, the support elements are completely fixed so that the control elements bearing on this support element always occupy the desired position.

The ribs preferably have a T, C or V section and the parts of the support elements which are associated with these ribs have a complementary shape.

The ribs and consequently also the associated support elements may advantageously have different forms so as to make possible only certain associations of support elements and slides.

In another variant, the support element has an upper face for receiving the control or display element, parallel to the bottom of the base, directed towards the lid and on which the control or display element is fixed.

This support face may advantageously form part of a T, C or V section upper part of the support element on which the control or display element of complementary shape slides, in a direction parallel to the support surface. In order to ensure a certain correspondance between the parts, the support elements and, depending on their assembly, the associated control or display elements may also have different shapes.

It is also possible to form the support element in a single piece with the associated control or display element.

To keep housings free for connection lines, connection cables etc, the support elements are advantageously cut slant wise in the zone placed between the support face and their end turned towards the bottom of the base.

The control elements may be switching elements, particularly elements associated with a contactor.

The member to be actuated by the control member fixed to the lid may be integrated in the switching unit, in particular in an electro-thermal relay, and the intermediate control element advantageously has a control slider slidable in a case, bearing on the support element and actuated by the corresponding control member.

In particular, with two control elements very close to each other, the associated control member may be in the form of a rotary switch which has advantageously a cam projecting from the inner face of the lid which, in one of the positions of the switch, drives directly one of the two control elements. In order to drive the control element placed just beside the rotary switch may advantageously have a transmission lever actuated in another position of the rotary switch by the cam so that this control element is actuated by this transmission lever.

The control member may also be advantageously a push button having on the inner face of the lid a transmission arm extending laterally from the axis of the push button whose free end is placed facing the associated control element or the member to be actuated.

In both cases, the control member may be offset laterally with respect to the associated control element. The actuating elements which engage in the control elements are directly aligned, with the lid placed on the base, with the associated control elements or the members to be actuated which may also be integrated in the switching unit.

Particularly in the case where members to be actuated are provided which are also integrated in the switching unit or when the slides of the control elements are disposed on the switching unit, it is essential for the switching unit to be also aligned accurately with the control members provided on the lid. For this, it is advantageous to provide, in the zone of a hat shaped section fixed to the bottom of the base, an adjustment assistance device fixing the switching unit in the longitudinal direction of said section. The switching unit may advantageously be fitted onto the hat shaped section. The adjustment assistance device prevents engagement taking place other than in a very precise predetermined position.

BRIEF DESCRIPTION OF THE DRAWINGS

In what follows the invention is described in a few embodiments, with reference to the drawings. These drawings show:

FIG. 1, the case of a switching and/or signalling apparatus;

FIG. 2, sections of different ribs serving as slides for the support elements;

FIG. 3, two different support elements with the associated control element;

FIG. 4, a display element formed as a single piece with the support element;

FIG. 5, a section through the assembled switching and/or signalling apparatus;

DESCRIPTION OF THE PREFERRED EMBODIMENTS

Figure 6:
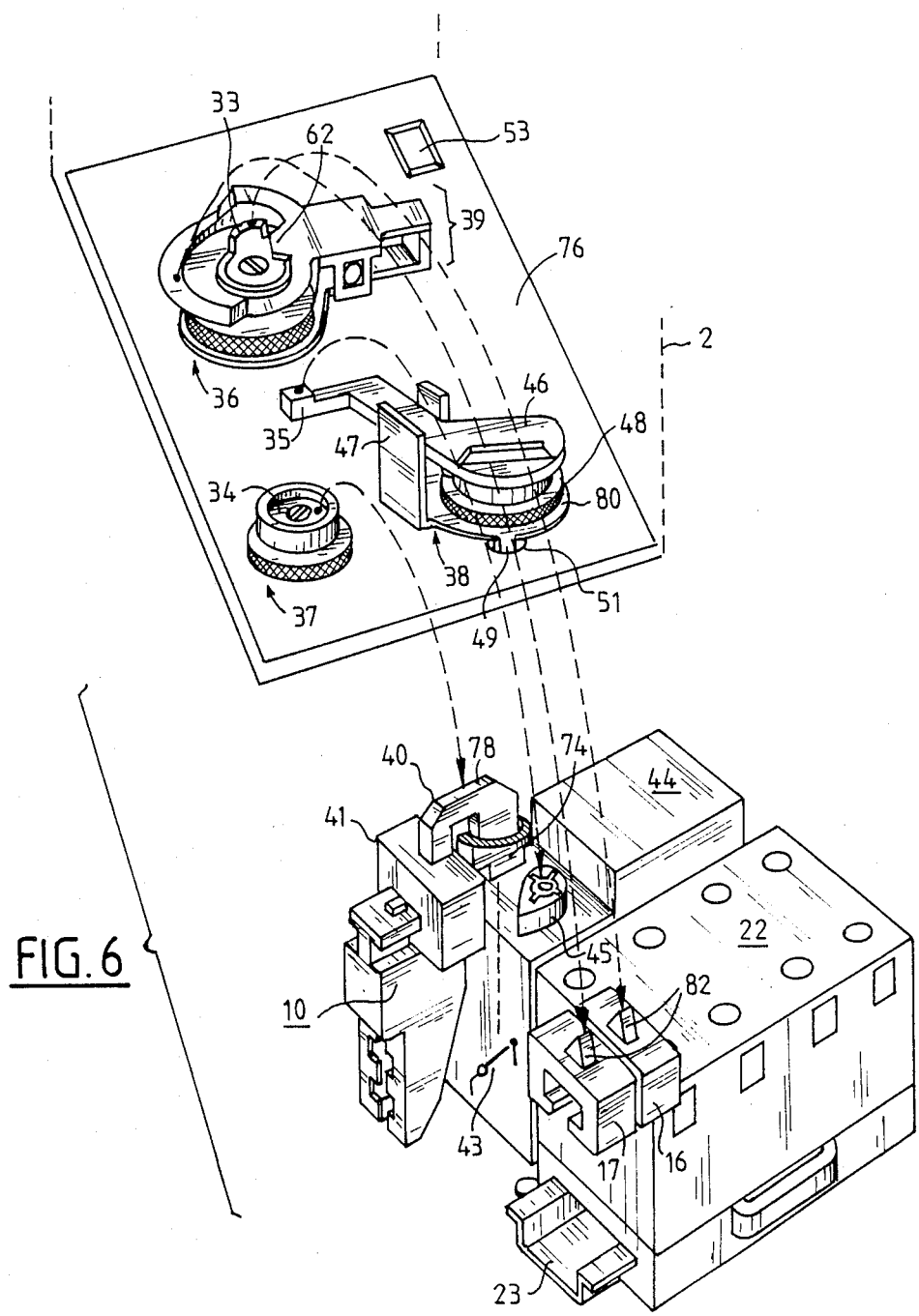
FIG. 6, an exploded view of some parts of the switching and signalling apparatus.

In FIG. 1 is shown the case 1, formed of a lid 2 and a base 5, of a switching and/or signalling apparatus. The switching unit to be inserted in case 1 has been removed. The sides walls 3, 4 of base 5 disposed vertically on bottom 6 have, on their inner faces, ribs 7, 8, 57 which serve as slides for the support elements 9, 10, 55, 55' asociated with different control elements 16, 17, 40, 41 (see FIGS. 3 to 6).

Ribs 7, 8 have a T section and ribs 57 a V section. The ribs may also have a C section instead of the T or V (cf. FIG. 2).

Ribs 7, 8, 57 extend from the bottom 6 of base 5 up to the upper edge 19 of this base with which they terminate at a single level.

Lid 2 has a cover face 76 as well as vertical side walls bearing on the edge 19 of base 5 when the case is closed.

On the cover face 76 of lid 2 are provided control members 36, 37, 38 which may be actuated from the outside, as well as an observation window 50.

Lid 2 is fixed by means of screws provided in the corner zones of base 5 so as to form a hermetically closed case 1.

In FIG. 2, the different possible section forms of the ribs 7, 8, 57 vertically extending upwards from bottom 6 of base 5 are illustrated. Ribs 7, 8 may have a T section 14 or a C section 14', whereas ribs 57 have a V section.

In FIG. 3, two different kinds of support elements 9, 10 or 55 are shown, to which a control member 16, 17 or a display element 50a, 50b is respectively associated.

The support elements 9, 10, 55 are fitted from above on the corresponding ribs 7, 8 or 57. For this, the support elements 9, 10, 55 have a lower part 12 or 56 which has a shape complementary to the respective section of the associated rib 7, 8, 57. For example, the support element 9, 10 has a part 12 of substantially C section which may be fixed on a rib 7, 8 with a T section 14. The support elements fitted on the ribs are fixed by these ribs in the transverse direction.

The support elements 9, 10 are provided with an outwardly directed nose piece 18 extending laterally thereof and bearing on the upper edge 19 of base 5. This nose piece 18 has an outwardly extending face 11 opposite which the lateral walls of the lid are located when the lid is fitted in.

In the fitted-in state, these support elements 9, 10, 55 are maintained downwardly by a rib 28 or by a projection fixed on a lateral wall 20 of lid 2.

As can be seen in FIG. 1, ribs 7, 8, 57 and therefore the support elements associated with said ribs, are of different shapes.

Whereas the control members 16, 17 or display elements 50a, 50b shown in FIG. 3 can be slid on the corresponding support element 9, 10 or 55 in a transverse direction, in FIG. 4, a support 55' is shown which is formed in a single piece with the associated display element 50c. This support element 55' has a lower part whose section is adapted to a V section rib (see FIG. 2).

The support elements 9, 10 and 55 (see FIG. 3) have respectively an upper bearing face 13, 58 parallel to the bottom 6 of base 5 and turned towards lid 2, to which the associated control member 16, 17 or display element 50a, 50b can be fixed.

In both cases, the bearing surface 13, 58 forms part of an upper portion of the support element 9, 10 or 55 having a longitudinal T section.

The control members 16, 17 or the display elements 50a, 50b have a lower portion 15 of complementary and substantially C shape.

The support elements 9, 10, 55 and correspondingly also the associated control members 16, 17 or display elements 50a, 50b can once more be of different shape.

For fitting the control member or display element in the sliding direction, a stop 72 is respectively provided on the bearing surface 13 or 58.

This stop is centrally located on the upper bearing surface 13 of the support elements 9, 10 so that on each side a respective control element 16 or 17 may be slid.

On the other hand, stop 72 of the support face 58 associated with support element 55 is placed at the rear end in the fitting direction.

The C shaped parts 15 of control elements 16, 17 or the display elements 50a, 50b engage in recesses 59 in the upper part, having a T shaped section, of the associated support element 9, 10 or 55.

For the support element 55, the spacer 70 connecting the upper face 58 to the lower part of the support is placed in the middle, whereas this spacer 70 is slightly offset to the right for the support element 9, 10.

The control elements 16, 17 are designed as switching elements with a switch case 42 and an actuating element 82. From the bottom of this case extend lines 16a, 16b for connecting this switching element to the associated switching unit.

The display elements 50a, 50b shown in FIG. 3 include a base forming the C shaped shoulder 15 as well as a lamp fixed on the base.

As can be seen in FIGS. 3 and 5, the support elements 9, 10, 55 are cut slantwise in the zone situated between their contact face 13, 58 and their end directed towards the bottom 6 of base 5 so as to create housings 31, 32 for the connection lines 30.

As can be seen in FIGS. 5 and 6, two control elements 16, 17 serving as switching elements are fixed to support element 9, side by side on the upper face thereof.

The switching unit mounted in base 5 includes a contactor 22 as well as an electro-thermal relay 44 (cf. FIG. 6 and 5).

The two control elements 16, 17 in the form of switching elements, placed side by side, are associated with contactor 22 (see FIG. 6). These two control elements 16, 17 are actuated by a control element in the form of a rotary switch 36 fixed to lid 2.

This rotary switch 36 has a cam 33 projecting from the inner face of the lid, which in one of the positions of the rotary switch 36, directly actuates the actuating element 82 of the control element 16. This cam 33 is disposed on a hollow protuberance of the rotary switch 36 so as to be able to move over a circular path.

This rotary switch 36 further has a transmission lever 39 which, in another position of the rotary switch 36, is actuated by the cam 33 and is moved towards the bottom 6 of base 5 so that the other control element 17 is actuated by this transmission lever 39.

The transmission lever 39 has a ring surrounding cam 33 at least partially which is engaged in the control element 17 or its actuating element 82.

The transmission lever 39 further has a protuberance 62 with which cam 33 actuates the annular section.

The annular section of transmission lever 39 is coaxial with the hollow protuberance carrying the cam 33. This form of rotary switch makes it possible to actuate control elements which, like the two switching elements 16, 17 are mounted very close to each other.

As can be seen particularly in FIG. 5, the support elements 9 and consequently control elements 16, 17 are disposed in a zone placed between a side wall 21 of contactor 22, and the side wall 3 of base 5. The control elements 16, 17 are substantially flush with contactor 22.

Whereas the control elements 16, 17 are in the form of switching elements associated with contactor 22 the control element associated with the electro-thermal relay includes a control slider 40 disposed for movement in a case 41 bearing on the associated support element 10. The associated control member placed in the cover face 76 of lid 2 is in the form of a push button 37. This push button 37 disposed directly facing the control slider 40 has a rod 34 which drives the back 78 of the control slider 40, essentially in the form of a U.

Whereas a leg of this control slider 40 slides in case 41 of the control element, the other leg drives a key 74 connected to a switching element 43 forming an opening switch integrated in the electro-thermal relay 44. Key 74 is disposed on the face of the thermocouple 44 turned towards lid 2.

The third control member 38 provided on lid 2 is also in the form of a push button which serves as reset button.

This push button or reset button 38 is associated with a member 45 to be actuated which in its turn is disposed on the face, turned towards lid 2, of the electro-thermal relay 44. The part of the face of the electro-thermal relay 44 supporting key 74 as well as the member 45 to be actuated is offset downwardly with respect to the rest of the upper face of this electro-thermal relay.

Whereas the control member 37 is disposed directly facing the control slider 40 of the control element 40, 41, push button 38 is offset laterally with respect to the member 45 to be actuated.

To make possible control of member 45, push button 38 has, on the inner face of lid 2, a transmission arm 46 which extends from the axis of the push button towards the side and whose free end 35 is placed facing the member 45 to be actuated.

In order to fix the transmission arm 46 of this push button 38 in its rotational position, a slide 47 is provided on the inner face of lid 2.

This slide 47 includes a fixing washer 80, inserted between lid 2 and an adjustment nut 48, to which a U shaped piece is attached laterally having two arms turned towards the bottom 6 of base 5 and between which the transmission arm 46 is guided.

Slide 47 is protected against rotation by a projection 49 provided on the fixing washer 80 which engages in a hollow or an opening 51 in lid 2.

At the free end 35 engaging with member 45 of the transmission arm 46 is disposed a projection directed towards the bottom 6 of base 5.

The contactor 22 is fixed to a hat shaped section 23 secured to the bottom 6 of base 5, whereas the electro-thermal relay 44 is fixed laterally to contactor 22.

Contactor 22 is fitted on this hat shaped section 23.

For fixing contactor 22 in the longitudinal direction of the hat shaped section 23, an adjusting device 24 is placed in the zone of this hat shaped section. This adjusting device is in the form of a right angled fixing bracket and has a recessed part in which engages a projection 25 provided at the edge of a part 27 of the bottom of contactor 22. An arm of this adjusting device 25 is fixed between the profiled section 23 and the bottom 6 of base 5 and is fixed to the bottom with the hat shaped section. On the end turned towards the contactor, this adjusting device 24 further has a fairly wide collar 26 opposite the lower edge of contactor 22.

Consequently, the contactor can only be engaged in a given position in the hat shaped section, in which projection 25 penetrates into the corresponding recess part of the adjusting device 24.

The cover face 76 of lid 2 is pierced with a bore 53 for the observation window 50 formed on the lid. Facing this bore or this window, display elements 50a, 50b or 50c are disposed equipped with indicator lights. The indicator lights may be neon lamps.

When lid 2 is fixed to base 5, the free end 35 of the transmission arm 46 of the push button 38 is automatically oriented on the member 45 to be actuated, cam 33 on the actuating element 82 of the control element 16, the annular section of the transmission lever 39 of switch 36 with the actuating element 82 of the control element 17 and the rod 34 of push button 37 with the control slider 40 of the control element 40, 41.

Member 45 actuated by the push button 38 is a reset element associated with the electro-thermal relay 44.

The display elements 50a, 50b, 50c disposed under window 50 may be used for indicating a voltage available at a coil 54 (see FIG. 7) of contactor 22 or at a motor M driven by the contactor.

Because of the fact that at least one of the control members 36, 37, 38 is not necessarily coaxial with the associated control element, these control members may be distributed functionally on the lid or its cover face. And in particular it is easy to drive control elements situated very close to each other. Furthermore, the control members may be dimensioned fairly wide so as to comply with certain safety regulations.

Figure 7:
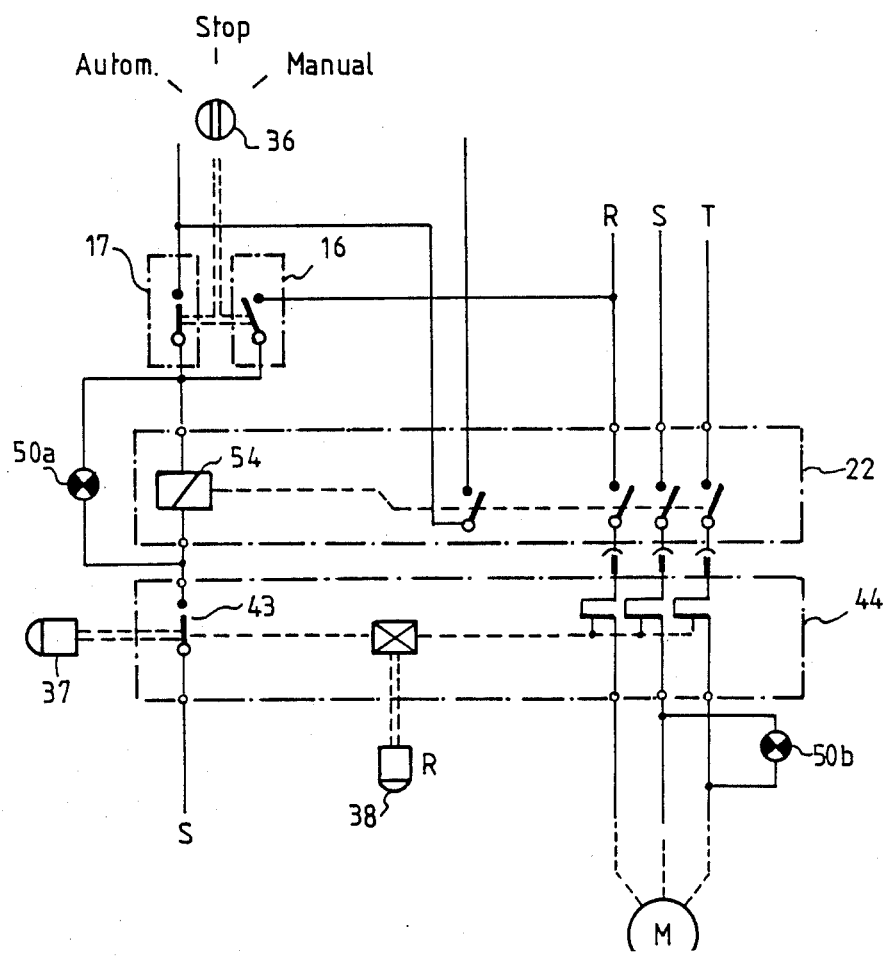
FIG. 7, a diagrammatical representation of the electric wiring of the switching and/or signalling apparatus.

FIG. 7 shows the diagram of the electric wiring of the apparatus. It can be seen particularly that the apparatus serves for driving a motor M. Push button 37 serves for actuating the opening switch 43 oriented towards the electro-thermal relay whereas push button 38 serves as reset member for said electro-thermal relay 44.

The rotary switch actuates alternately the two control elements 16, 17 formed as switching elements as described.

What is claimed is:

1. A switching apparatus comprising:
   i. a case having a base and a lid, said base having side walls and a bottom wall; said side walls having upper edges;
   ii. at least one switching unit arranged in said base for providing a free space between said side walls and said switching unit;
   iii. manual control members mounted on the lid and accessible from the outside of the case;
   iv. the switching unit having actuating members controlled from said manual control members and housed on said base;
   v. elongate slides formed in said side walls in a direction at right angles to said bottom wall and,
   vi. support members forming elongate slide parts which slidingly cooperate with said elongate slides and supporting parts substantially parallel to said bottom wall, said actuating members being mounted on said supporting parts in said free space.

2. The switching apparatus as claimed in claim 1, wherein said slides are in the form of ribs.

3. The switching apparatus as claimed in claim 1, wherein each support member has an outwardly directed nose piece bearing on an upper edge of the base.

4. The switching apparatus as claimed in claim 1, wherein each support member is held in position towards the bottom wall by a projection provided on the lid.

5. The switching apparatus as claimed in claim 1, wherein each actuating member and the associated supporting part are formed as a single piece.

6. The switching apparatus as claimed in claim 1, wherein each actuating member is slidably mounted on the associated supporting part.

7. The switching apparatus as claimed in claim 1, wherein each of said support members have a lower end region located between said supporting part and said bottom wall, said lower end region being cut slantwise.

* * * * *